United States Patent [19]

Scalley et al.

[11] 4,335,370

[45] Jun. 15, 1982

[54] VEHICLE SECURITY DEVICE

[76] Inventors: Douglas M. Scalley, 21 McGregor Rd., Ravenswood, Cumbernauld; John M. Mullin, 11 Kirriemuir Gdns., Bishopbriggs, Glasgow, both of Scotland

[21] Appl. No.: 265,726

[22] Filed: May 21, 1981

[51] Int. Cl.³ .................... B60R 25/04; B60R 25/10
[52] U.S. Cl. .................... 340/64; 340/825.56; 307/10 AT
[58] Field of Search .......... 340/64, 63, 825, 825.56, 340/825.36; 307/10 AT

[56] References Cited

U.S. PATENT DOCUMENTS 4,205,325 5/1980 Haygood et al. ............. 340/63

Primary Examiner—Alvin H. Waring
Attorney, Agent, or Firm—Krass, Young & Schivley

[57] ABSTRACT

A security device for controlling the ignition circuit of a vehicle provided with a steering lock 11. The device comprises an electrical circuit having: a security ignition circuit switch means CO32 for opening and closing said ignition circuit independently of any manually operable ignition circuit switch means; and a steering lock control switch means MS1 connectable to said steering lock 11 and having disabling and non-disabling operating conditions, corresponding respectively to locked and unlocked positions of the steering lock 11, for respectively disabling and not disabling said vehicle with respect to starting thereof. A plurality of user actuable first switch means 3 is arranged so that operation thereof is necessary in a predetermined sequence to close the security ignition circuit switch means CO32. An alarm connection means CO52 is connected to alarm means SIREN and arranged for activation in response to actuation of said first switch means 3 in an incorrect sequence. In use of the device the vehicle can only be started when said first switch means 3 have been actuated in said predetermined sequence and said steering lock 11 has been placed in its unlocked position.

12 Claims, 5 Drawing Figures

VEHICLE SECURITY DEVICE

The present invention relates to vehicle security devices and in particular to devices intended to prevent the unauthorised use of vehicles.

The theft and unauthorized use of vehicles is a considerable and increasing problem. Various proposals have been made involving key-operated devices and/or concealed switches in the ignition circuit. In practice though these can generally be circumvented without too much difficulty. It has also been previously proposed to utilize an electrically operated combination lock to control the ignition circuit of a car. In practice though these can generally be circumvented without too much difficulty. It has also been previously proposed to utilize an electrically operated combination lock to control the ignition circuit of a car. In practice though this by itself will often be insufficient to fully protect a vehicle since vehicles are often left unattended for considerable periods of time during which a criminal could circumvent or by-pass the control of the ignition circuit by such a lock; damage the car, remove valuable items from the engine compartment or other parts of the vehicle interior, or even tow away the vehicle.

It is an object of the invention to provide an improved security device for a vehicle which device avoids or minimizes one or more of the abovementioned disadvantages.

In particular it is an object of the invention to provide a security device which incorporates a steering lock control means for preventing unauthorized towing of the vehicle and preventing unauthorized unlocking of the steering lock, said control means being arranged for also avoiding the possibility of an authorized user starting the car whilst the steering lock is still locked.

The present invention provides a security device for controlling the ignition circuit of a vehicle provided with a steering lock having locked and unlocked positions and a starter motor circuit, said device comprising an electrical circuit having: a security ignition circuit switch means for opening and closing said ignition circuit, in use of the device, independently of any manually operable ignition circuit switch means; a steering lock control switch means connectable to said steering lock, in use of the device, and having disabling and non-disabling operating conditions, corresponding respectively to locked and unlocked positions of the steering lock, for respectively disabling and not disabling said vehicle with respect to starting thereof; a plurality of first switch means actuable by a vehicle user and arranged in a security circuit so that operation of each of said first switch means is necessary in said predetermined sequence to close said security ignition circuit switch means; and connection means for connection of said electrical circuit to a power supply means; and an alarm connection means, at least one of said vehicle having an audible warning and/or lighting system connectable to said alarm connection means, and said alarm connection means being connected to a separate alarm means, said alarm connection means being arranged for activation thereof in response to actuation of said first switch means in an incorrect sequence, whereby in use of the device the vehicle can only be started when said first switch means have been actuated in said predetermined sequence and said steering lock has been placed in its unlocked position.

It should be understood that the expression "switch means" is used herein in a broad sense to include in the case of the first switch means any switch means readily operable by a user such as mechanical switch means operable by physical displacement or electrostatic switch means operable by physical contact or close proximity, and in the case of the other switch means, electrical, electromechanical and electronic including solid state switch or relay means.

Preferably said steering lock of the vehicle is provided with unlocking means, an electrically operated drive means for operating said unlocking means, a drive means electrical circuit connected to said drive means for supplying electrical power thereto, a first drive means electrical circuit switch means arranged for opening and closing said drive means electrical circuit, and so that operation of each of the first switch means is necessary in said predetermined sequence to close said first drive means electrical circuit switch means, whereby in use of the vehicle the steering lock can only be unlocked by said drive means when the first switch means have been actuated in said predetermined sequence.

Advantageously the steering lock includes a bolt member movably mounted in a body member mountable in a vehicle in proximity to its steering column, said bolt member being movable between a "locked" position for engagement with the steering column so as to prevent steering movement thereof and an "unlocked" position; and a latching means for retaining the bolt member in its "locked" position; said unlocking means being arranged for freeing the bolt member from said latching means and moving said bolt member to its unlocked position, and said electrically operated electromagnetic drive means being arranged for directly or indirectly displacing said latching means from its position for retaining the bolt member and/or moving said bolt member to its "unlocked" position.

In a further aspect there is provided a security device of the present invention when installed in a vehicle.

Further preferred features of the invention will appear from the following description given by way of example of various embodiments of the security device illustrated with reference to the accompanying drawings in which.

Figure 1:
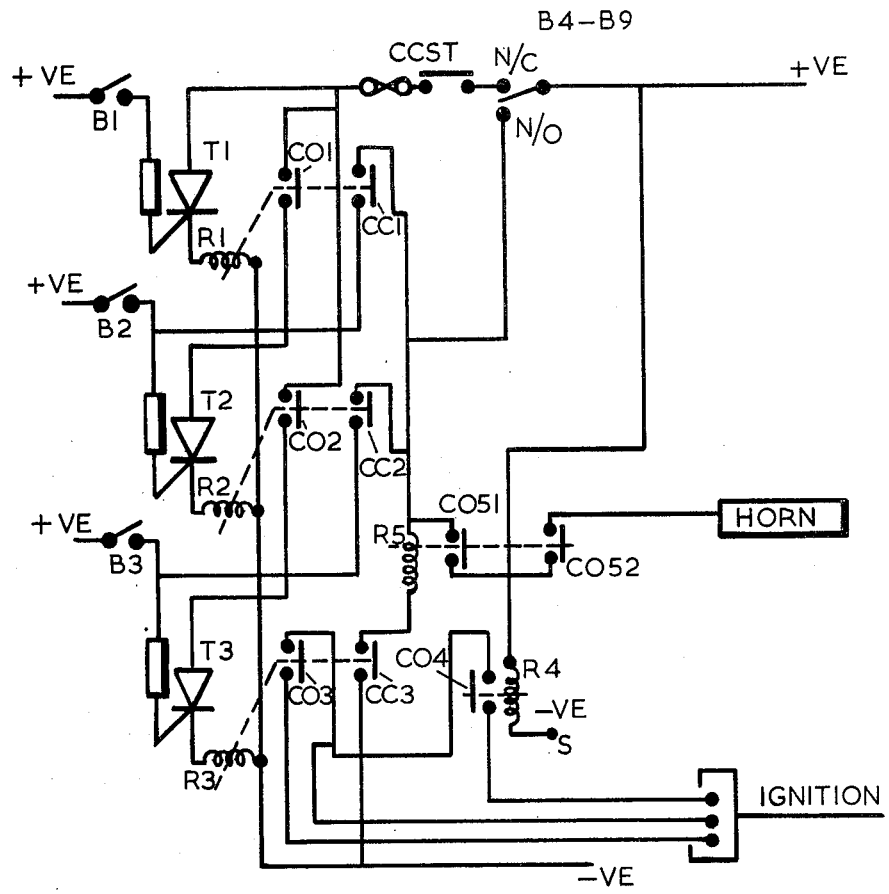
FIG. 1 is a partial schematic circuit diagram of a first security device.
Figure 2:
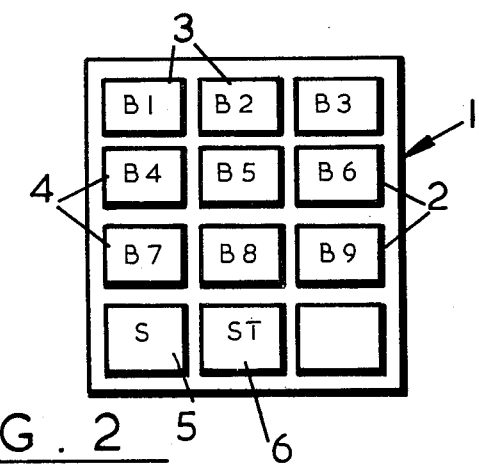
FIG. 2 is a schematic diagram of a keyboard for use with the device of FIG. 1.

In FIG. 1 is shown a keyboard unit 1 having a plurality of push button or touch operated keys 2 including a plurality (three) of first switch means 3, in the form of first switches (B1, B2, B3), a plurality of additional dummy first switch means 4 in the form of dummy first switch means (B4–B9), a starter switch means 5 (S) and a stop switch means 6 (ST).

The first switch means 3 are connected to successive stages of a multi-switch unit comprising a plurality of second switch means each of which comprises a thyristor (T1, T2, T3) and each of said first switches (B1–B3) and dummy first switches (B4–B9) comprises a dual position switch with a positive supply and arranged so that when the switches are operated they feed a positive supply to the control panel to trigger the thyristor in the case of the first (B1) in the sequence of the first switches B1–B3; to trigger the thyristor and power the alarm circuit (see below) unless this has been deactivated (see below) in the case of the other first switches B2, B3; and to feed a positive supply direct to the alarm circit in the case of the dummy first switches B4–B9. As the dummy first switches are operated and switched to feeding a positive supply to the alarm circuit the positive supply to the switching part of the circuit is cut off thereby disabling the ignition circuit.

When the first (B1) in the sequence of the first switches (B1–B4) is actuated it switches on the first stage thyristor T1, which receives a positive supply via a suitable fuse (e.g. 1 amp) and a normally closed switch controlled by a stop button ST which is included on the keyboard, so that T1 then allows a current to pass through a first stage relay R1. This relay R1 closes normally open contact CO1 to supply positive voltage to the second stage thyristor T2 and opens normally closed contacts CC1 which cut off a connection from the second first switch means B2 to the alarm circuit (further described below).

Operation of B2 then switches on thyristor T2 to supply positive voltage to the second stage relay R2 which closes normally open contacts CO2 to supply positive voltage to the third stage thyristor T3 and opens normally closed contacts CC2 which cut off a connection from the third first switch means B3 to the alarm circuit.

Operation of B3 then switches on the thyriston T3 which operates in similar manner through third stage relay R3 to close CO3 and open CC3. The ignition circuit may then be completed by pressing a starter button S which activates relay R4 thereby to close normally open contacts CO4 and activate the starter motor to start the vehicle engine. Thus CO3 functions as a security ignition circuit switch means.

At the same time, opening of the normally closed contacts CC3 breaks the negative side connection to an alarm circuit relay R5 thereby preventing subsequent activation of the alarm relay R5 e.g. by inadvertent operation a dummy first switch B4–B9 which would otherwise result in the closing of the normally open contacts CO51 and CO52 which would complete a connection from the positive supply to the horn and/or other alarm signal device and set it off.

Thus by operating the first switches B1 to B3 in the correct order the vehicle may be started without setting off the alarm. On the other hand if any of the dummy first switch means is depressed in place of one or more of B1 to B3 then the alarm is set off. Also if for example B2 is activated before B1 then since B2 has not been de-alarmed by the opening of CC1, the alarm will be set off. Naturally other switches operating in the same manner as the above-mentioned dummy first switches B4–B9 may also be included to protect the bonnet, boot and/or other items against unauthorised opening or other tampering.

If the alarm is set off by an authorized user in error then it may be readily switched off simply by operating the first switches B1–B3 in the correct order as described above though if it is then desired to re-alarm it, it is necessary to operate the stop switch ST (see below).

In order to stop the vehicle engine the ignition circuit is cut by opening normally closed contacts CCST controlled by the stop switch ST. This operation also serves to re-alarm the system described above by deactivating the relays R1 to R3 and allowing the normally open and normally closed contacts CO1-3 and CC1-3 to revert to their natural state. To restart the vehicle at this stage and/or de-alarm it, it is necessary to again operate the first switches B1 to B3 in the correct order.

The various first switches 3 and dummy first switches 4 can be marked with any convenient indicia such as numbers or letters of the alphabet. Naturally, in order to maximize security, the arrangement of the first switches 3 on the keyboard 1 would normally be randomized as far as possible to minimize the possibility of an unauthorised person accidentally identifying both the first switches 3 from amongst the apparently identical dummy first switches 4 and their correct order. Also the number of stages could be increased to further improve security or even reduced to two though in most cases three stages would be a practical minimum.

It will be appreciated that many modifications and additions can be made to the above embodiment without departing from the scope of the present invention. Thus for example the keyboard 1 could be in the form of a plug in module so that the vehicle owner can remove it from the vehicle when he leaves it to still further increase security.

Also by providing a switch actuable by opening of the vehicle bonnet or engine compartment or other access panel connected for operation in similar manner to the dummy first switches, any attempts to bypass the device by short circuiting the ignition leads would be considerably hindered by the alarm being set off. Furthermore the various relays and the thyristors could be replaced by electronic (including solid state) switch means or other electronic switch means, respectively. In addition a switch actuable by operation of a conventional key-operated steering lock could also be connected for operation in similar manner to the dummy first switches. Advantageously though a, directly or indirectly, electromagnetically operable bolt means steering lock is connected so as to be operable to its "unlocked" position either automatically or with the aid of a suitale switch, when the secondary ignition circuit switch means is closed. An example of a suitable lock is shown in FIG. 3 which is a schematic side view of a steering lock.

Figure 3:
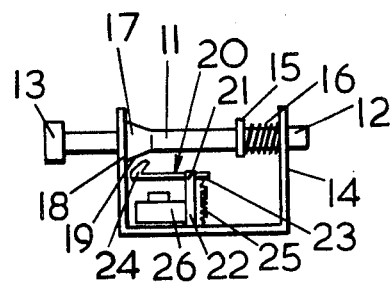
FIG. 3 is a schematic view of a first steering lock for use with the above device.

In FIG. 3 is shown a lock comprising a bolt member 11 having at one end a locking pin 12 engageable with the steering column (not shown) and at its other end digitally operable button 13 and mounted slidably in a chassis member 14 spaced inwardly from one end is provided an annular flange 15 which serves as a stop means for retaining a return spring 16 acting between the flange 15 and part of the chassis 14 through which the locking pin is slidably disposed.

Spaced inwardly from the other end is provided a catch means 17 in the form of a radially extending raised portion having an abuttment face 18 disposed opposite the button 13 on one side and on its other side an inclined cam surface 19.

A latch member 20 is pivotally mounted 21 on a support member 22 towards a first end 23 so that the second end 24 is disposed for latching with the catch means 17 of the bolt member 11. The first end 23 is connected to the chassis 14 by a latch return spring 25. An electromagnet 26 is disposed in proximity to the second end 24 and is connected by suitable wiring (not shown) to the security device as will be further described below.

In FIG. 3 the bolt member 11 is shown in its "unlocked" position with the abutment surface 18 abutting a portion of the chassis through which the end of the bolt member 11 where the abutment surface 18 extends slidably and with the locking pin 12 in its fully retracted position. When the button 13 is depressed the bolt member moves towards the right (as viewed in the drawing) with the locking pin 12 moving into engagement with the steering column. At the same time the return spring 16 is compressed by the annular flange 15, whilst the cam surface 19 of the catch means 17 gradually depresses the second end 24 of the latch member 20 against the force of the return spring 25 until said second end 24 is able to latch into engagement with the abutment surface 18 of the catch means 17 to retain the bolt member 11 in its "locked" position.

The bolt member is then retained in this locked position until the second end 24 of the latch member 20 is withdrawn from engagement with the catch means 17 against the force of the return spring 25 by the electromagnet 26. This in turn will not occur until current is supplied to the electromagnet 26 following "unlocking" of the security device and operation of an optional separate steering lock release switch means.

Figure 4:
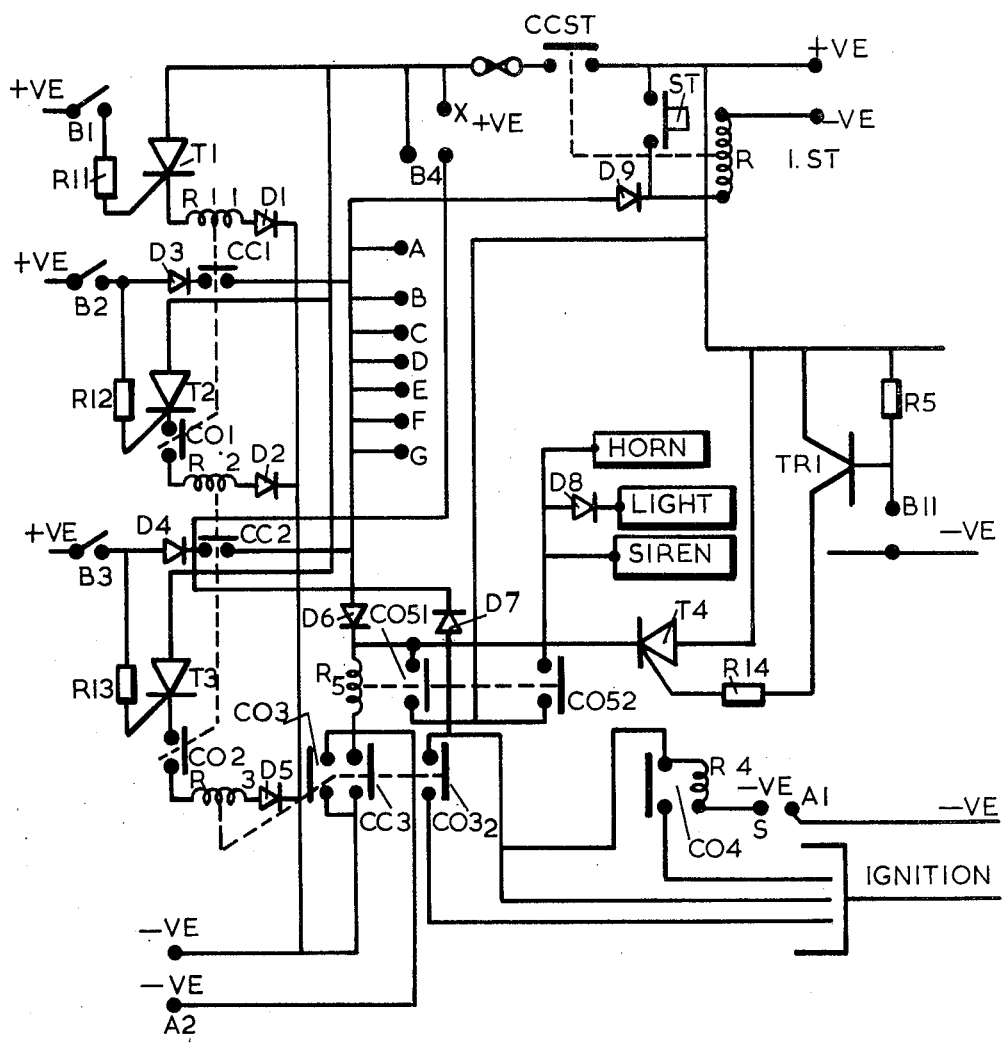
FIG. 4 is a diagram corresponding to FIG. 1 of a second device.

FIG. 4 shows a device generally similar in form and operation to that of FIG. 1 but with certain modifications as identified below.

In order to protect the various second switch means (Relays R1 to R3) and other switch means against possible incorrect operation suitable means such as diodes D1 to D9 are included in the circuit.

The circuit also includes a further switch means B4 for protecting, for example, the bonnet, boot door, footbrake, etc. against unauthorized operation. It will be noted that the further switch means is arranged to be de-alarmed following operation of only the first two first switch means B1, B2 in the correct sequence. This enables, for example, the boot to be opened by an authorized user for access thereto whilst still retaining the ignition circuit in a protected condition.

The drawing also shows a normally open "STOP" switch means ST, closure of which re-alarms the circuit by opening the normally closed contacts CCST (see above). Additional and/or alternative alarm means usable together with or instead of the horn include the lights of the car (LIGHT) and a separate siren (SIREN).

In order to protect the electrical circuitry of the vehicle itself, a so-called "24-hour loop" B11 is connected into the security circuit via a transistor TR1 (with a base disconnected resistor R15) and a thyristor or equivalent switch means T4 (with a suitable resistor R14 therebetween).

The normally open contact CO3 of the circuit of FIG. 1 (operable by the third stage relay R3) is in this case replaced by two normally open contacts CO31 and CO32, the first of which controls electrical supply to the steering lock drive means electrical circuit (see below) at A2 whilst the second is as in FIG. 1, functions as (or controls) a security ignition circuit switch means. Operation of a start switch S in the starter motor circuit activates a relay closing normally open contacts CO4 to activate the starter motor to start the vehicle engine.

Figure 5:
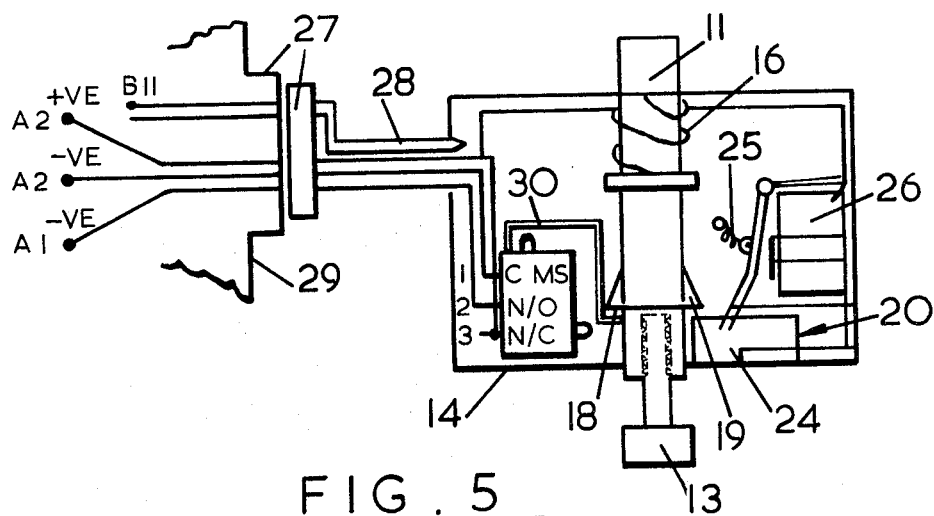
FIG. 5 is a view corresponding to FIG. 3 of a second steering lock.

The steering lock shown in FIG. 5 is generally similar to that of FIG. 3, like parts being indicated by like reference numbers, but also includes a normally open micro switch MS1 arranged to function as an ignition circuit switch with an operating lever 30 of said micro switch MS1 arranged for displacement to an activated position by the abutment surface 19 of the catch means 17 as the bolt member 11 is moved to its unlocked position by the spring 16 following withdrawal of the second end 24 of the latch member 20 by the electromagnet 26 against the force of the latch return spring 25.

It will be appreciated that the above device can be used in various ways, for example, in the various ways described hereinbefore in connection with the electromagnetically operable bolt means steering lock as used in conjunction with the ignition circuit control security device.

As used herein, a directly operating electromagnetic drive means is one in which use is made directly of movement produced by electromagnetic forces e.g. attraction of a ferromagnetic material member by an electromagnet, whilst an example of an indirectly operating one is an electric motor whose drive output is converted in suitable manner to perform the required movement.

In the interests of safety it would normally be preferred that there is used a security device of the invention in which the arrangement is such that both the ignition and electro-magnetic drive steering lock circuits are controlled so that the start switch means cannot be used to start the car after "unlocking" of the security device by correct operation of its first switch means unless the steering lock has first been unlocked, either automatically upon "unlocking" of the security device or by the operation by the user of separate steering lock switch means. In the latter case there could for example be provided an additional ignition circuit means which is closed only upon operation of the separate steering lock switch means.

As may also be seen in FIG. 5 the steering lock unit is conveniently connected to the security device via a multiconnector plug and socket means 27 for easy replacement etc. disconnection thereof being protected by carrying a part 28 of the "24-hour" loop therethrough onto the security lock side. The connections from the connector 27 to the security device circuit are identified A2+VE, A2−VE, and A1−VE, the appropriate connections of the security device circuit therefor being correspondingly identified in FIG. 4. The part of the connection 27 remote from the steering lock is conveniently attached to a suitable part of the vehicle structure 29.

Although it will be appreciated that with the present invention it is possible to rely on the security ignition circuit switch means and starter switch alone and dispense entirely with any manually operable ignition circuit switch means such as in a conventional key-operated combined ignition and starter switch, there may be included or retained (in the case of conversion of an existing vehicle) such a manually operable ignition circuit switch means provided any such manual switch means operates independently of the security ignition circuit switch means.

What is claimed is:

1. A security device for controlling the ignition circuit of a vehicle provided with a steering lock having locked and unlocked positions and a starter motor circuit, said device comprising an electrical circuit having: a security ignition circuit switch means for opening and closing said ignition circuit, in use of the device, independently of any manually operable ignition circuit switch means; a steering lock control switch means connectable to said steering lock, in use of the device, and having disabling and non-disabling operating conditions, corresponding respectively to locked and unlocked positions of the steering lock, for respectively disabling and not disabling said vehicle with respect to starting thereof; a plurality of first switch means actuable by a vehicle user and arranged in a security circuit so that operation of each of said first switch means is necessary in said predetermined sequence to close said security ignition circuit switch means; and connection means for connection of said electrical circuit to a power supply means; and an alarm connection means, at least one of said vehicle having an audible warning and/or lighting system connectable to said alarm connection means, and said alarm connection means being connected to a separate alarm means, said alarm connection means being arranged for activation thereof in response to actuation of said first switch means in an incorrect sequence, whereby in use of the device the vehicle can only be started when said first switch means have been actuated in said predetermined sequence and said steering lock has been placed in its unlocked position.

2. The security device of claim 1 wherein said steering lock of the vehicle is provided with unlocking means, an electrically operated drive means for operating said unlocking means, a drive means electrical circuit connected to said drive means for supplying electrical power thereto, a first drive means electrical circuit switch means arranged for opening and closing said drive means electrical circuit, and so that operation of each of the first switch means is necessary in said predetermined sequence to close said first drive means electrical circuit switch means, whereby in use of the vehicle the steering lock can only be unlocked by said drive means when the first switch means have been actuated in said predetermined sequence.

3. The security device of claim 2 wherein said plurality of first switch means is connected to respective ones of a plurality of second switch means for operation thereof in response to actuation of the first switch means, said second switch means being arranged in said circuit in a predetermined sequence so that operation of each of said second switches after the first one in said sequence is conditional upon the previous operation of the preceding one of said second switches in said sequence.

4. The security device of claim 3 wherein said steering lock includes a bolt member movably mounted in a body member mountable in a vehicle in proximity to its steering column, said bolt member being movable between a "locked" position for engagement with the steering column so as to prevent steering movement thereof and an "unlocked" position; and a latching means for retaining the bolt member in its "locked" position; said unlocking means being arranged for freeing the bolt member from said latching means and moving said bolt member to its unlocked position, and said electrically operated electromagnetic drive means being arranged for directly or indirectly displacing said latching means from its position for retaining the bolt member and/or moving said bolt member to its "unlocked" position.

5. The security device of claim 4 wherein the drive means electrical circuit or the or a said switch means thereof is arranged for controlling said ignition circuit so that the ignition circuit cannot be activated until said first drive means electrical circuit switch means has been closed.

6. The security device of claim 5 wherein said first drive means electrical circuit switch means is arranged for simultaneous operation with a said ignition circuit switch means.

7. The security device of claim 6 wherein said first drive means electrical circuit switch means and said ignition circuit switch means are comprised by a double-pole switch.

8. The security device of claim 6 which device is provided with additional, dummy, first switch means and further switch means disposed for protection of the vehicle against unauthorised interference and wherein the alarm connection means is arranged for also activating said vehicle audible warning and/or lighting system and/or said separate alarm in response to actuation of at least one of said dummy first switch means and said further switch means.

9. The security device of claim 8 wherein the vehicle has a door and wherein is provided a said further switch means connectable to said door in use of the device, and wherein the device is provided with a time delay means arranged for delaying activation of said vehicle audible warning and/or lighting system and/or said separate alarm means, for a short predetermined period of time.

10. The security device of claim 9 wherein the first switch means and dummy first switch means are incorporated in a keyboard.

11. The security device of claim 1 wherein the steering lock control switch means is arranged for disabling and not disabling at least one of the ignition circuit and the starter motor circuit, in said disabling and non-disabling operating conditions, respectively, thereof, in use of the device.

12. A security device for controlling the ignition circuit of a vehicle provided with a steering lock having locked and unlocked positions and a starter motor circuit, said device comprising an electrical circuit having: a security ignition circuit switch means for opening and closing said ignition circuit, in use of the device, independently of any manually operable ignition circuit switch means; a steering lock control switch means connectable to said steering lock, in use of the device, and having disabling and non-disabling operating conditions, corresponding respectively to locked and unlocked positions of the steering lock, for respectively disabling and not disabling said vehicle with respect to starting thereof; a plurality of first switch means actuable by a vehicle user and arranged in a security circuit so that operation of each of said first switch means is necessary in said predetermined sequence to close said security ignition circuit switch means; and connection means for connection of said electrical circuit to a power supply means; whereby in use of the device the vehicle can only be started when said first switch means have been actuated in said predetermined sequence and said steering lock has been placed in its unlocked position.

* * * * *

UNITED STATES PATENT AND TRADEMARK OFFICE
CERTIFICATE OF CORRECTION

PATENT NO. : 4,335,370
DATED : June 15, 1982
INVENTOR(S) : Douglas M. Scalley et al It is certified that error appears in the above-identified patent and that said Letters Patent are hereby corrected as shown below:

Column 8, line 2 delete "or a".

Signed and Sealed this

Thirty-first Day of August 1982

[SEAL]

Attest:

GERALD J. MOSSINGHOFF

Attesting Officer

Commissioner of Patents and Trademarks